US010861308B1

(12) United States Patent
Simpson et al.

(10) Patent No.: US 10,861,308 B1
(45) Date of Patent: Dec. 8, 2020

(54) SYSTEM AND METHOD TO IMPROVE EMERGENCY RESPONSE TIME (71) Applicant: Siemens Industry, Inc., Alpharetta, GA (US)

(72) Inventors: Christoffer Simpson, Hoschton, GA (US); Tina Najibi, San Jose, CA (US); Mark Kadoshnikov, Atlanta, GA (US); Charlton Buck, Fort Wayne, IN (US); Danielle Galimidi, Side Door, GA (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 16/425,151

(22) Filed: May 29, 2019

(51) Int. Cl.
*G08B 15/00* (2006.01)
*G08B 17/08* (2006.01)
*G08B 27/00* (2006.01)
*H04W 4/90* (2018.01)
(Continued)

(52) U.S. Cl.
CPC ............. *G08B 17/08* (2013.01); *G06F 9/542* (2013.01); *G08B 25/009* (2013.01); *G08B 27/005* (2013.01); *H04W 4/90* (2018.02)

(58) Field of Classification Search
CPC ................. B65D 88/78; Y10T 137/402; Y10T 137/4673; Y10T 137/7039; Y10T 137/8259; F41A 17/08; G08B 7/066; G08B 13/1672; G08B 21/02; G08B 7/062; G08B 19/00; G08B 5/36; F41G 1/12; F41G 1/32; F41G 1/38; F41G 1/46; F41G 3/165; H02J 9/02; H02J 9/065; H04B 17/318; H04W 4/33; H04W 4/90; H05B 47/19; Y10S 367/906; F41H 11/12; F42B 12/36; F42B 12/52; G06Q 90/205; G09F 13/005

USPC .. 340/385.1, 384.72, 384.73, 682, 676, 679, 340/651, 640, 577, 539.27
See application file for complete search history.

(56) References Cited

U.S. PATENT DOCUMENTS

| 5,504,717 A * | 4/1996 | Sharkey ................. G01S 3/808 367/124 |
| 7,277,018 B2 | 10/2007 | Reyes et al. |
| 9,830,932 B1 | 11/2017 | Gunderson et al. |

(Continued)

FOREIGN PATENT DOCUMENTS

| WO | 2019159098 | 8/2019 |
| WO | 2019159099 | 8/2019 |

(Continued)

OTHER PUBLICATIONS

PCT Search Report dated Aug. 12, 2020, for PCT Application No. PCT/US2020/033509, 14 pages.

*Primary Examiner* — Daniel Previl (57) ABSTRACT

There is described a fire detection/notification system for detecting a weapons discharge comprising a network and a control panel. The network includes multiple wireless devices, and each device includes a fire-related sensor and a first weapons discharge sensor, and a second weapons sensor. The control panel is configured to identify the weapons discharge based on data generated by the first and second weapons discharge sensors and produce an alert signal in response to identifying the weapons discharge. The control panel is connected to the network and includes an output circuit configured to communicate with an emergency responder device external to the fire detection/notification system in response to receiving the alert signal.

20 Claims, 7 Drawing Sheets

(51) Int. Cl.
*G06F 9/54* (2006.01)
*G08B 25/00* (2006.01)

(56) References Cited

U.S. PATENT DOCUMENTS

| | | | |
|---|---|---|---|
| 10,051,349 B2* | 8/2018 | Schattmaier | H04Q 9/00 |
| 10,089,845 B2* | 10/2018 | Skorpik | G08B 21/02 |
| 10,514,237 B2* | 12/2019 | Piccioni | B64C 39/024 |
| 2006/0004582 A1 | 1/2006 | Claudatos et al. | |
| 2006/0105299 A1* | 5/2006 | Ferris | G09B 19/00 |
| | | | 434/11 |
| 2009/0270705 A1* | 10/2009 | Enegren | A61B 5/0031 |
| | | | 600/365 |
| 2009/0295591 A1* | 12/2009 | Bedingfield | A61M 1/14 |
| | | | 340/660 |
| 2011/0037586 A1* | 2/2011 | Lu | G16H 40/20 |
| | | | 340/539.1 |
| 2012/0170412 A1* | 7/2012 | Calhoun | G01S 3/8083 |
| | | | 367/118 |
| 2013/0100268 A1* | 4/2013 | Mihailidis | G08B 21/0492 |
| | | | 348/77 |
| 2014/0218518 A1 | 8/2014 | Oliver | |
| 2014/0361886 A1 | 12/2014 | Cowdry | |
| 2016/0232774 A1 | 8/2016 | Noland et al. | |
| 2017/0169686 A1 | 6/2017 | Skorpik et al. | |
| 2017/0228993 A1 | 8/2017 | Avak et al. | |

FOREIGN PATENT DOCUMENTS

| | | |
|---|---|---|
| WO | 2019159100 | 8/2019 |
| WO | 2019159101 | 8/2019 |
| WO | 2019159102 | 8/2019 |
| WO | 2019159103 | 8/2019 |
| WO | 2019159104 | 8/2019 |
| WO | 2019159105 | 8/2019 |
| WO | 2019159106 | 8/2019 |

* cited by examiner

Fig. 7

SYSTEM AND METHOD TO IMPROVE EMERGENCY RESPONSE TIME

RELATED APPLICATIONS

This application is related to U.S. patent application Ser. No. 16/425,563, titled SYSTEM AND METHOD TO IMPROVE EMERGENCY RESPONSE TIME, filed on May 29, 2019.

FIELD OF THE INVENTION

Aspects of the present invention generally relate to fire detection and/or notification systems for buildings and, more particularly, a fire detection/notification system and method for detecting and responding to emergencies and other related incidents within a building environment.

BACKGROUND

In the event of any emergency, response time is critical. Emergency response time is especially important for systems that detect weapons discharge, such as gunshot detection, because the majority of shooting events end within 12 minutes. Delays in notifying emergency responders may have a substantial impact on the victims of the events. Thus, emergency response time must be minimized in order to save lives, and building occupants must be notified as quickly as possible.

Generally, fire detection and/or notification systems provide fire-related monitoring and protection services for a building. Modern fire detection/notification systems may be automated and include various components distributed throughout the building for detecting fire-related hazards, such as fire, smoke, or combustion, and alerting occupants of the building. Components of the fire detection/notification system may include heat detectors, smoke detectors, CO detectors, $CO_2$ detectors, motion detectors, alarms, sirens, annunciators, power supplies, displays, monitors, control panels, air samplers, extinguishers, valves, actuators, call switches and/or other devices used for detecting hazards within the building. The system may report a hazard by sounding an alarm and/or notifying a fire detection/notification agent, such as a local fire detection/notification organization and/or trigger an appropriate corrective action, such as activating an extinguishing system.

A security system may be integrated with the fire detection/notification system to provide security-related services for the building, in addition to the fire-related services. The security system may include components different from the fire detection/notification system to provide access control, intrusion detection, and video surveillance of selected areas of the building. Even so, the security system is similar to the fire detection/notification system in that the security system may report a hazard by sounding an alarm and/or notifying a security agent, such as a home security service. Since the security system reports the hazard in a manner similar to the fire detection/notification system, the integration of the security system with the fire detection/notification system results in operational synergies and efficiencies. On the other hand, the integration of the two systems is challenging due to the differences between the systems, i.e., detection of fire-related hazards vs. detection of security-related hazards.

Existing systems for detecting weapons discharge do not integrate well with fire detection/notification systems. Most buildings already have some form of fire detection/notification system and, for those buildings that do not include any type of system, an existing fire detection/notification system may be easily installed efficiently and economically. There may be an undue financial and timing burden in installing a second system to detect other emergencies, such as a weapons discharge detecting system.

SUMMARY

Briefly described, a fire detection and/or notification system of a commercial or residential facility may be enhanced to detect other emergencies, such as detecting a weapons discharge. The fire detection/notification system and method combine fire detection/notification with weapons discharge protection. The fire detection/notification system and method may also provide services for other emergency indicators such as break-ins, occupant falling and calling for help, water left running, vehicle starting in garage/lot (indicating theft), and other acoustic abnormalities. The fire detection/notification and the weapons discharge system may share common functions such as, but not limited to, common circuitry for communicating with emergency responders. These functions of fire detection/notification and weapons discharge are combined in a single fire detection/notification system to provide greater visibility and ease of use as well as to minimize costs and implementation time.

One aspect is fire detection/notification system for detecting a weapons discharge comprising a network and a control panel. The network includes multiple devices, and each device of the multiple devices include a smart base and a detection unit. The detection unit includes a fire-related detection sensor. The smart base includes a first weapons discharge sensor and a second weapons discharge sensor. The first weapons discharge sensor includes an audio sensor and the smart base is configured to communicate via the network. The control panel is connected to the network. The control panel is configured to identify a weapons discharge hazard based on data generated by the first and second weapons discharge sensors and produce an alert signal in response to identifying the weapons discharge hazard. The control panel includes an output circuit configured to communicate with an emergency responder device external to the fire detection/notification system in response to receiving the alert signal.

Another aspect is a method of a fire detection/notification system for detecting a weapons discharge in which the system including a network of devices and a control panel. A device of the network of devices includes a detection unit and a smart base. The detection unit generates first data associated with a fire-related hazard detected by a fire-related detection sensor. The smart base generates second data associated with a weapons discharge hazard detected by a first weapons discharge sensor and a second weapons discharge sensor of the smart base. The first weapons discharge sensor including an audio sensor. The smart base transmits at least one of the first data or the second data to the control panel. The control panel transmits the weapons discharge hazard based on the second data generated by the first and second weapons discharge sensors. The control panel produces an alert signal in response to identifying the weapons discharge hazard. The system communicates with an emergency responder device external to the fire detection/notification system in response to receiving the alert signal.

Yet another aspect is fire detection/notification system for detecting a weapons discharge comprising a network and a control panel. The network includes multiple devices, and each device of the multiple devices includes a fire-related detection sensor, a first weapons discharge sensor, and a second weapons discharge sensor. The first weapons discharge sensor includes an audio sensor. The control panel is connected to the network. The control panel is configured to identify a weapons discharge hazard based on data generated by the first and second weapons discharge sensors and produce an alert signal in response to identifying the weapons discharge hazard. The control panel includes an output circuit configured to communicate with an emergency responder device external to the fire detection/notification system in response to receiving the alert signal.

Still another aspect is a method of a fire detection/notification system for detecting a weapons discharge in which the system includes a network of devices and a control panel. A device of the network of devices generates first data associated with a fire-related hazard detected by a fire-related detection sensor. The device also generates second data associated with a weapons discharge hazard detected by a first weapons discharge sensor and a second weapons discharge sensor. The first weapons discharge sensor including an audio sensor. The device transmits at least one of the first data or the second data to the control panel. The control panel identifies the weapons discharge hazard based on the second data generated by the first and second weapons discharge sensors. The control panel produces an alert signal in response to identifying the weapons discharge hazard. The system communicates with an emergency responder device external to the fire detection/notification system in response to receiving the alert signal.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

To facilitate an understanding of embodiments, principles, and features of the present invention, they are explained hereinafter with reference to implementation in illustrative embodiments. In particular, they are described in the context of a weapons discharge detection system integrated with a fire detection and/or notification system. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

The fire detection and/or notification system (also known as fire detection/notification system and fire alarm system) and method described herein combines fire detection/notification with one or more other emergency related features, such as weapons discharge protection. Since fire detection/notification systems are common and readily available, some embodiments of the system and method are directed to a fire detection/notification system including, or retrofitting existing systems with, weapons discharge detection features and utilize existing functions of fire detection/notification systems. For example, fire detection/notification systems may already include fire-related sensors, such as smoke detectors, so a fire detection/notification system may include audio sensors and a weapons discharge detection circuit to integrate weapons discharge protection feature. Also, the system may further include additional sensors, such as infrared ("IR") sensors, thermal sensors, pressure/shock sensors, fiber optics sensors, or additional audio sensors, to reduce false positives and/or false negatives. Thus, the fire detection/notification system is an enhancement of existing systems, which may include smoke detectors, duct detectors, pull stations, horn/speaker strobes, and the like, by including the additional features of detecting weapons discharge, alerting occupants of the discharge, and notify emergency responders. For some embodiments, the fire detection/notification portion of the system and the weapons discharge portion of the system may share common functions, such as a common output circuit for communicating with emergency responders, and the use of the one fire detection/notification system for these functions provides greater visibility and ease of use than separate systems. In addition, integration of weapons detection with existing systems may minimize costs and implementation time. Further advantages of the fire detection/notification system described herein may be realized via service upgrades, product updates, and migrations as well as test and inspection opportunities.

In addition, some embodiments of the fire detection/notification system and method may include, or retrofit existing systems with, wireless mesh networks. In particular, wireless devices may be positioned throughout a commercial or residential facility and communicate with each other to form the wireless mesh network. Each wireless device may transmit information associated with itself and serve as a relay for other wireless devices of the wireless mesh network, as well as the remainder of the fire detection/notification system. Since each wireless device utilizes the wireless mesh network, the wireless device may be positioned anywhere within a facility where a wired, wireless, or portable power source is available.

The fire detection/notification system, particularly the weapons discharge feature, may detect various types of threats or safety issues such as, but not limited to, glass breakage, forced portal entries, accident detection, calls for assistance, extended operation of short duration appliances, initiation of vehicles at unusual times or locations, acoustic detection of emergency events (such as fire and explosions), and the like. The weapons discharge feature of the fire detection/notification system may further collect other information that may be useful for evaluating threats or safety issues such as, but not limited to, machine failures (e.g., unexpected noise), occupancy of the facility, or other abnormalities at the facility.

The fire detection/notification system can eventually also integrate with other systems of the building management system, such as access control, surveillance and building automation. The fire detection/notification system operates in conjunction with one or more other systems to create a response from the facility, such as closing and potentially locking doors in areas that do not contain the threat. The fire detection/notification system may also be accessible to facility occupants for improved situation awareness and simplified mass notification in order to save lives.

The fire detection/notification system and method described herein combines fire detection/notification with weapons discharge protection. In particular, the fire detection/notification system performs the function of multiple systems by combining a system of fire detection/notification and mass notification with a weapons discharge detection system. For some embodiments, the fire detection/notification system allows for leveraging some components of existing infrastructure, such as alert notification devices and circuitry for communicating with emergency responders, without the need for separate systems for fire detection/notification and weapons discharge detection.

Figure 1:
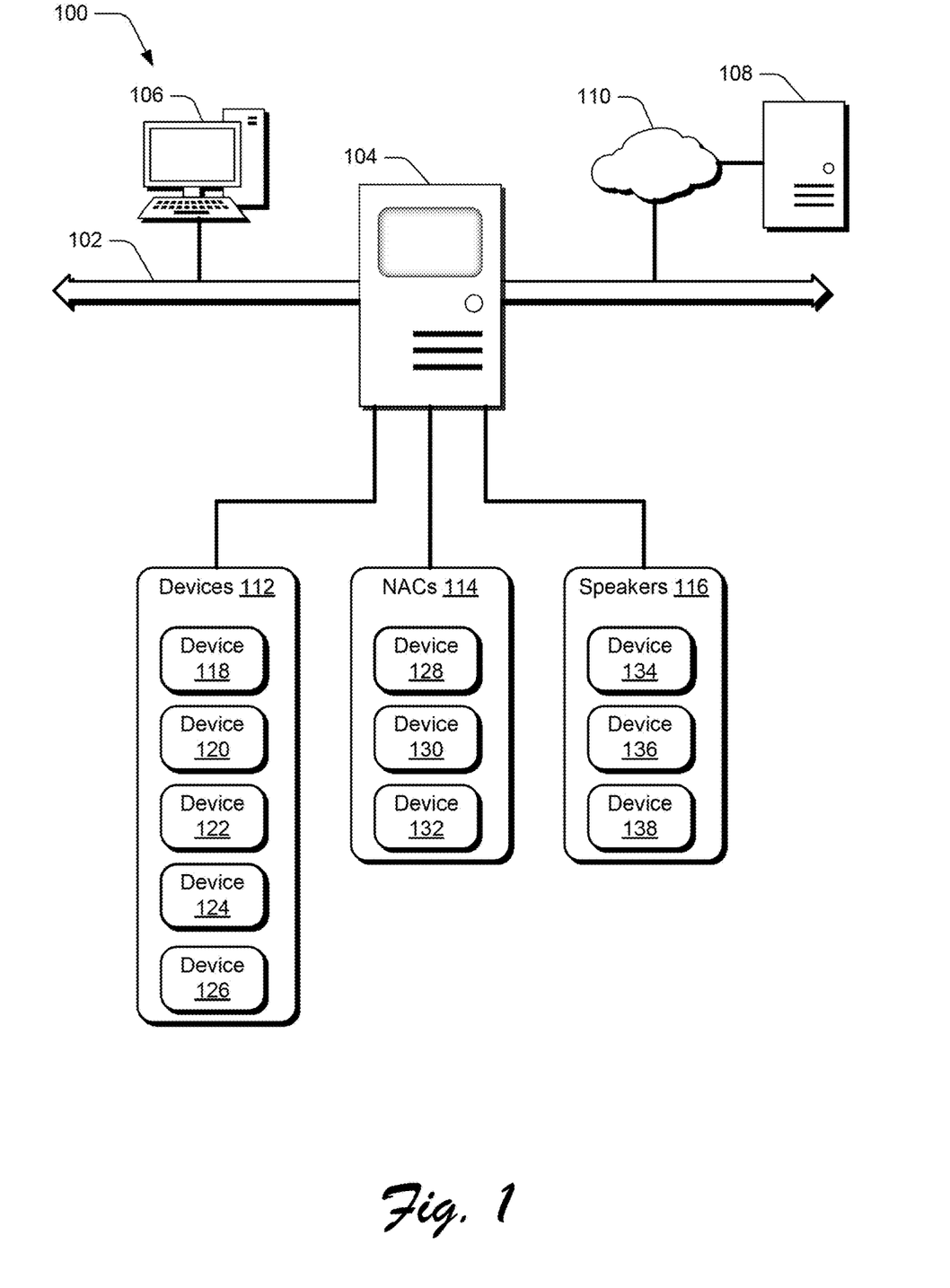
FIG. 1 is a schematic diagram of a fire detection and/or notification system for detecting a weapons discharge in accordance with the present invention.

Referring to FIG. 1, there is shown a fire detection/notification system 100 for detecting a weapons discharge. The fire detection/notification system 100 includes a communication bus 102 to facilitate communications among various components, such as a control panel 104 and a management device 106. The control panel 104 is a device that identifies a fire-related hazards based on data received from fire-related input devices and manages fire-related output devices based on the identified fire-related hazard. As explained in detail below, the control panel 104 also identifies the weapons discharge based on data generated by weapons discharge sensors and manages weapons discharge output devices based on the identified weapons discharge hazard. The management device 106, such as a workstation and/or server, sets and/or changes the functions of the various components communicating via the communication bus 102, such as control panel 104.

The other components, such as outside device 108, may communicate indirectly with components of the fire detection/notification system 100 via a communication network 110. Examples of the outside devices include, but are not limited to, remote terminals for receiving, provide, or exchanging data as well as other building management systems for controlling comfort functions, such as temperature, humidity, ventilation, lighting, security, and the like. Other examples of outside devices include, but are not limited to, building functions such as alerts, alarms, door opening/closing, and the like. While a brief description of the fire detection/notification system 100 is provided below, it is to be understood that the fire detection/notification system described herein is only one example of a particular form or configuration for the fire detection/notification system and the system may be implemented in any other suitable manner without departing from the scope of this disclosure.

For the embodiment represented by FIG. 1, the fire detection/notification system 100 provides connectivity to subsystems for various fire safety parameters. For example, control panel 104 may be communicating via wired or wireless link with various advanced devices 112 or basic devices, such as Notification Appliance Circuit ("NAC") devices 114 and other basic devices 116, for monitoring and controlling fire detection/notification for areas within a commercial or residential facility or a group of facilities. Examples of advanced devices include, but are not limited to, smart detectors 118, conventional detectors 120, air duct devices 122, input/output modules 124, and pull stations 126. NAC devices 114 notify occupants of a facility about a fire or other life-threatening emergency. The NAC is a physical wire loop that provides power to NAC devices 114, so the NAC supervises the wires that make up the circuit as opposed to the devices themselves. The circuit extends from the control panel 104 to the NAC devices 114 located within the facility as connected by the physical wire loop. Examples of the notification appliances includes, but are not limited to, strobes 128, horns 130, chimes, bells 132, klaxons, and speakers. Other basic devices 116 are similar to the NAC devices 114 but require more management than mere power control, such as speakers that require audio signals for providing dynamic sounds and announcements. It is to be understood that the fire detection/notification system 100 may comprise any suitable number of any of components 112-138 based on particular configurations for each facility or group of facilities.

The fire detection/notification system 100 further includes devices and components for integration of weapons discharge features. In particular, the advanced devices 112 may include wired or wireless devices having fire-related detection sensors and weapons discharge sensors and the control panel 104 may include one or more weapons discharge circuits to communicate with the wired or wireless devices, respond by managing other devices and components of the fire detection/notification system, and communicate with an emergency responder device external to the fire detection/notification system.

The fire detection/notification system 100 may include security to protect communications among devices and components as well as communications with outside devices. For example, the communications may be encrypted, and each device may be identified by signed credentials. The security may facilitate prevention of spoofing of signals by a perpetrator and suppression of detection of events or eavesdropping on signals by the perpetrator.

Figure 2:
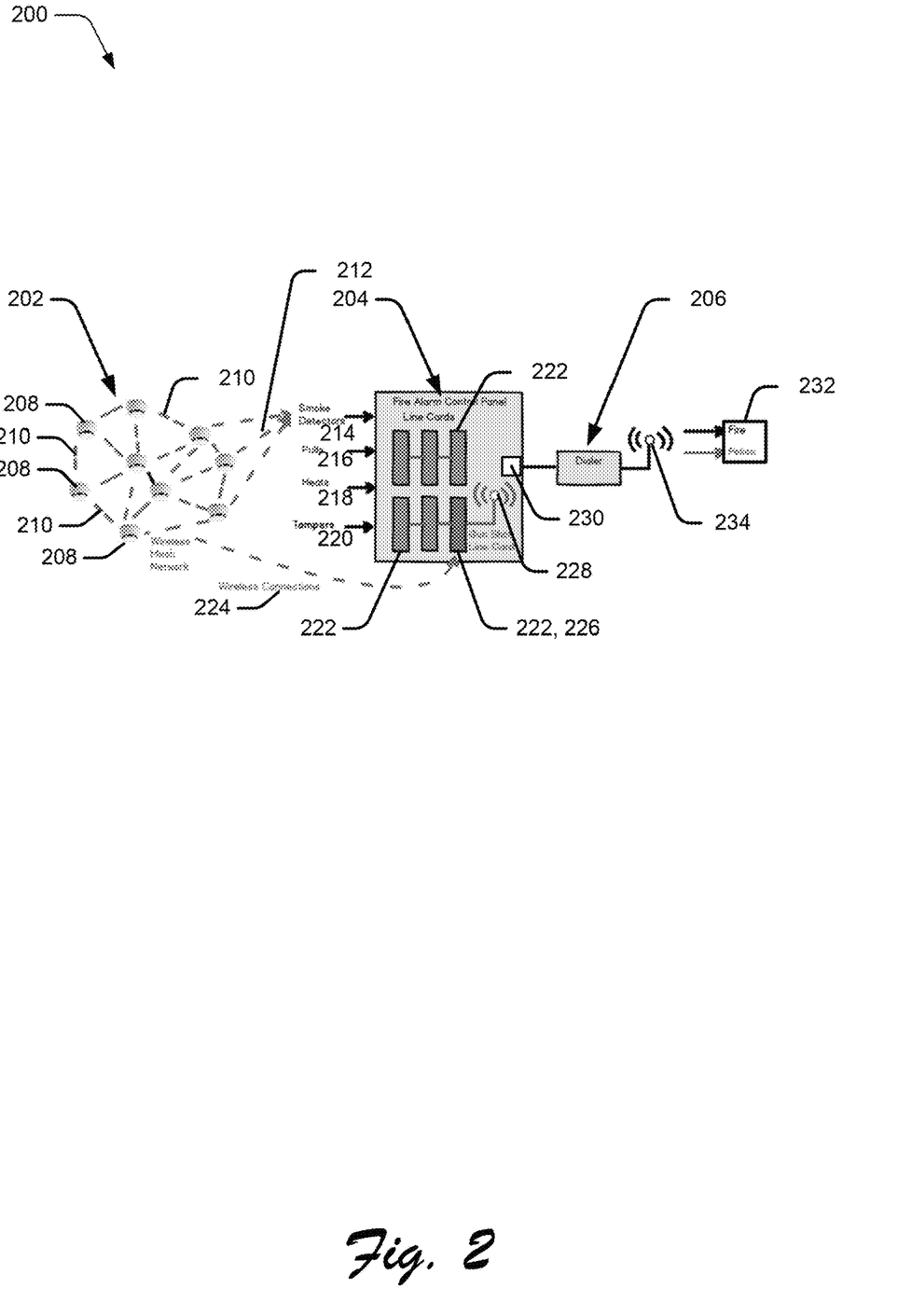
FIG. 2 is another schematic diagram of another fire detection/notification system for detecting a weapons discharge in accordance with the present invention.

Referring to FIG. 2, there is shown another fire detection/notification system for detecting a weapons discharge. The fire detection/notification system a network 202, a control panel 204, and an output device 206. Examples of networks 202 include wired networks, wireless mesh networks, or a combination of wired and wireless networks). The network 202 includes multiple wired or wireless devices 208 having capabilities for communication with each other via wired or wireless intra-network links 210. Examples of devices 208 include, but are not limited to, weapons discharge detection devices and smoke detection devices. The wireless communications may include multi-band wireless communication to hinder an external party, such as a perpetrator, from blocking frequencies and to offer greater resilience to outside interference. Each device 208 may include a wireless communication module configured to communicate via the network. 202. Examples of the wireless communication capabilities include, but are not limited to, satellite-based communications, cellular-based communications and their variants, and wireless local area network (WLAN) communication and their variants. Examples of VI/LAN communications include, but are not limited to, IEEE 802.11 (Wi-Fi), IEEE 802.16 (WiMAX), Bluetooth, BLE, and Zig- Bee. Wireless communications may further include other forms of communication such as microwave or infrared technology (IR). One or more of the devices may also utilize, in addition to or in the alternative, wired technology for communication, such as transmission of data over a physical conduit, e.g., an electrical cable or optical fiber cable. Each device 208 transmits information detected by one or more of its sensors and serves as a relay for other devices of the network 202. If any device fails to function, the network is not compromised; the network will continue to function irrespective of the non-working device or devices.

Each device 208 also requires a power source for enabling sensor operation, wireless communication (and wired communication, if applicable), and other functions of the device. The power source for each device 208 may be a wired electrical connection, a wireless power transfer ("WPT"), or a portable connection (such as a battery).

Each device 208 further includes wired or wireless communication capabilities, via the wired or wireless communication module or another component of the device, for communication via inter-device links 212 with the control panel 204. The examples of communication capabilities for intra-network links 210, described above, may also apply for communications via the inter-device links 212 with the control panel 204.

The control panel 204 includes input components configured to receive inputs 214-220 from various input devices of the fire detection/notification system 200. Examples of inputs to the control panel 204 include, but are not limited to, a smoke detector input 214, a pull input 216, a heat input 218, and a tamper input 220. The inputs 214-220 received by the control panel 204 may be processed by various components of the control panel. For example, the control panel 204 includes one or more line cards or module cards 222 that process the inputs 214-220 by themselves or in conjunction with other circuits of the control panel.

The control panel 204 may include a module card 222 configured to receive input relating to the weapons discharge. The module card 222 may also be capable of detecting and reacting to other acoustic abnormalities that may indicate one or more hazards. The input may be received via an input component of the control panel 204 or directly via a wireless link 224 to a weapons discharge module card 226, which is one of the modules cards 222 of the control panel. The weapons discharge module card 226 may include a wireless receiver 228 for wireless communication with the network 202. The weapons discharge module card 226 may also be configured to identify the weapons discharge based on data received from one or more devices 208 of the network and produce an alert signal in response to identifying the weapons discharge and, for some embodiments, to the potentially changing location of the weapons discharge as well.

An output circuit 230 of the control panel 204 may communicate with an emergency responder device 232 external to the fire detection/notification system 200 in response to receiving the alert signal from the weapons discharge module card 226. The output circuit 230 of the control panel 204 is configured to communicate with one or more output devices 206, such as an internet communicator, a cellular dialer, a plain old telephone system or landline ("POTS"), and/or a radio. The output circuit 230 of the control panel 204 may communicate with the output device (s) 206 via a wired connection or a wireless external link 234. The output circuit 230 of the control panel 204 is configured to communicate with the emergency responder device(s) 232 in response to receiving the alert signal from the weapons discharge module card 226. The output circuit 230 of the control panel 204 may also communicate with building occupants via phone or computer and send building alerts and controls.

For some embodiments, processing of a weapons discharge hazard may be performed, in part or entirely, at a device of the network of devices. In addition to the control panel 204, processing may be executed at the detection unit; at the smart base; at the detection unit and the smart base; at the detection unit and the control panel; at the smart base and the control panel; or at the detection unit, the smart base, and the control panel. For example, each component or a combination of these components may be configured to identify the weapons discharge based on data received from one or more devices of the network and produce an alert signal in response to identifying the weapons discharge. By performing some or all processing at the device, bandwidth requirements across the network for communications between one or more devices and the control panel may be minimized. In addition, objections by users and occupants about privacy concerns may also be minimized. For example, instead of forwarding detected audio in a proximal environment to the control panel, each device may process the detected audio by matching the detected audio to one or more audio profiles stored at the device and verify the weapons detection hazard with a secondary weapons detection sensor. In the manner, the device may communicate a result of the processing, or a processed version of the detected audio, to the control panel.

Figure 3A:
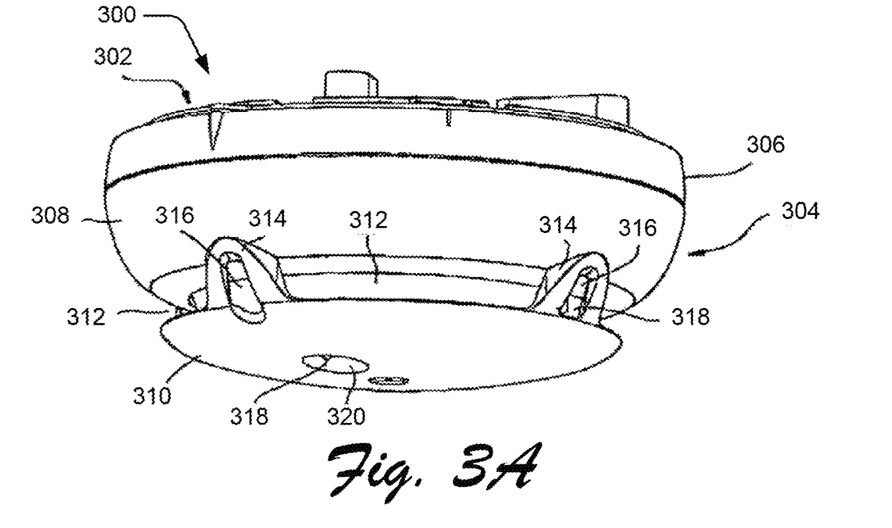
FIGS. 3A, 3B, and 3C are perspective views of an example devices that may be utilized for the fire detection/notification systems represented by FIGS. 1 and 2.

FIG. 3A illustrates an example device 300 of a network that may be utilized for the fire detection/notification systems. The device 300 includes a smart base 302 and a detection unit 304 removably coupled to the smart base. The smart base 302 includes a base housing 306 to protect the inner components from external elements, and the detection unit 304 includes a unit housing 308 and a detector hood 310 to protect the inner components from external elements. A gap 312 between the unit housing 308 and the detector hood 310 allows for air flow through an inner chamber of the device 300 to facilitate operation of one or more the detector hood 310 includes two or more protrusions 314 for releasable attachment to a lower end of the unit housing 308 to position a non-protrusion portion of the detector hood 310 a fixed distance from the lower end of the unit housing. Each protrusion 314 of the detector hood 310 may further include an aperture 316 to facilitate airflow through the inner chamber and/or flexibility of the protrusion for attachment to, and detachment from, the lower end of the unit housing 308.

The device 300 further includes and supports hazard detection sensors 318, in the smart base 302, the detection unit 304, or both, to identify any weapons discharge. Examples of hazard detection sensors include, but are not limited to, a fire-related detection sensor, a first weapons discharge sensor, a second weapons discharge sensor. Examples of hazard detection sensors may also include, but are not limited to, additional sensors for other acoustic abnormalities and other sensors for detecting one or more hazards. A fire-related detection sensor is any type of sensor that may be used to detect a hazard associated with fire detection/notification systems, such as a smoke detector. A weapons discharge sensor is any type of sensor that may be used to detect a hazard associated with weapons detection systems, such as an audio sensor to listen for gunshot-based sounds. One or more sensor apertures 320 may be included in the smart base 302 and/or detection unit 304 to facilitate or enhance operation of associated sensors adjacent to the sensor aperture.

Figure 3B:
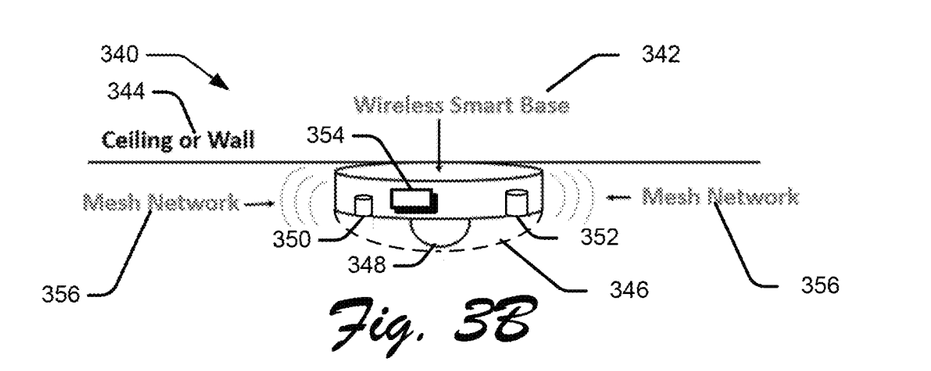

FIG. 3B illustrates core components of an example device 340 that may be utilized for the fire detection/notification systems in which many lesser components are omitted for ease of understanding. The example device 340 includes a smart base 342 that may be installed to an existing fire alarm system that already includes smoke detectors or similar devices. The example device 340 may be retrofitted to an existing system to facilitate the addition of weapons discharge detection features and utilize existing functions of fire systems. For example, a simple base may be swapped-out for a smart base 342 of the example device 340, as well as changes to other components of the system such as the control panel, to retrofit the system with weapons discharge detection features.

As shown in FIG. 3B, the example device 340 includes the smart base 342 that may be affixed to a building structure 344, such as a ceiling or wall, as well as a detection unit 346 that may be removably attached to the smart base. For the embodiment shown in FIG. 3B, the smart base 342 may include a first weapons discharge sensor 350 and a second weapons discharge sensor 352, and the detection unit 346 may include a fire-related detection sensor 348. Examples of a fire-related detection sensor 348 may include an ionization or photoelectric sensor such as a smoke detector. Examples of a first weapons discharge sensor 350 may include an audio input sensor such as a microphone, and examples of a second weapons discharge sensor 352 may include any type of sensor to supplement the first weapons discharge sensor such as an infrared sensor. Specific examples of the second weapons discharge sensor include audio sensors and non-audio sensors. Examples of audio sensors include, but are not limited to, a glass breakage sensor, a portal intrusion sensor, a request for assistance sensor, an unattended appliance sensor, a machine failure sensor, and an occupancy sensor. Examples of non-audio sensors include, but are not limited to, an infrared sensor (as identified above), a thermal sensor, a pressure sensor, a fiber optics sensor, and a portal status sensor.

The device 340, or a device separate from the network, may include a thermal sensor or an infrared ("IR") sensor to detect occupancy at determined locations throughout a facility. By utilizing the devices to detect people and their locations within a facility, the fire detection/notification system may facilitate the ability of emergency responders to locate individuals, whether alive or not. The devices and the other devices of the fire detection/notification system may also identify and/or determine the status of these individuals, such as the occupants who are injured, dead or hiding. The fire detection/notification system may further utilize the occupancy information to locate and attend to injured or hiding individuals as soon as possible once the hazard situation has been cleared.

For some embodiments, the smart base 342 of the device 340 may include a wireless communication module 354 configured to communicate via a network 356. The wireless communication module 354 may be located in the smart base 342, as opposed to the detection unit, in order to provide certain benefits to the device 340 and the fire detection/notification system. By including the wireless communication module 354 in the smart base 342, wireless communication capabilities may be added to a detection unit that is only capable of wired communications during installation or post-installation modifications. Thus, for these embodiments, the smart base 342 also provides easy installation and positioning of a detection unit at desirable and/or optimal locations of a commercial or residential facility. Further, a network may continue to operate even if the detector unit of the device 340 is disabled. For example, a perpetrator may attempt to disable the fire detection/notification system or the weapons discharge feature by removing the detector unit from the smart base 342 or otherwise damaging the detector unit. The smart base 342 may continue to operate while the detector unit is disable so the network will not be compromised. Also, even if the smart base 342 is disabled by the perpetrator, the network may continue to operate by routing signals through other devices, thereby bypassing the disabled smart base.

Figure 3C:
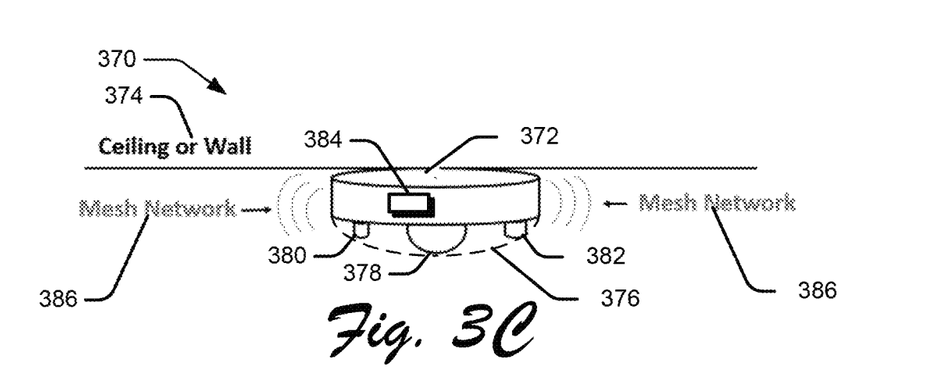

FIG. 3C illustrates core components of another example device 370 that may be utilized for the fire detection/notification systems in which, similar to the example device 340 of FIG. 3B, many lesser components are omitted for ease of understanding. The example device 370 includes a base 372 that may be affixed to a building structure 374 and a detection unit 376 that may be removably attached to the base. The example device 370 may be retrofitted to an existing system to facilitate the addition of weapons discharge detection features and utilize existing functions of fire systems. For example, an existing smoke detector may be swapped-out for a detection unit 376 of the example device 370, as well as changes to other components of the system such as the control panel, to retrofit the system with weapons discharge detection features.

As shown in FIG. 3C, the detection unit 376 of the example device 370 may include a fire-related detection sensor 378, a first weapons discharge sensor 380, and a second weapons discharge sensor 382. Examples of the fire-related detection sensor 378, the first weapons discharge sensor 380, and the second weapons discharge sensor 382, as well as the audio sensors and non-audio sensors of the second weapons discharge sensor, are similar to those sensors described above for the example device 340 of FIG. 3B. In addition, the device 370, or a device separate from the network, may include a thermal sensor or an infrared ("IR") sensor to detect occupancy at determined locations throughout a facility for the advantages described above with respect to example device 340 of FIG. 3B.

The base 372 of the device 370 may include a wireless communication module 384 configured to communicate via a network 386. The wireless communication module 384 may be located in the base 372, as opposed to the detection unit, in order to provide certain benefits to the device 370 and the fire detection/notification system. By including the wireless communication module 384 in the base 372, wireless communication capabilities may be added to a detection unit that is only capable of wired communications during installation or post-installation modifications. The base 372 also provides other advantages due to its ease of installation and positioning, ability of continual operation similar to the smart base 342 of the example device 340 of FIG. 3B.

Figure 4:
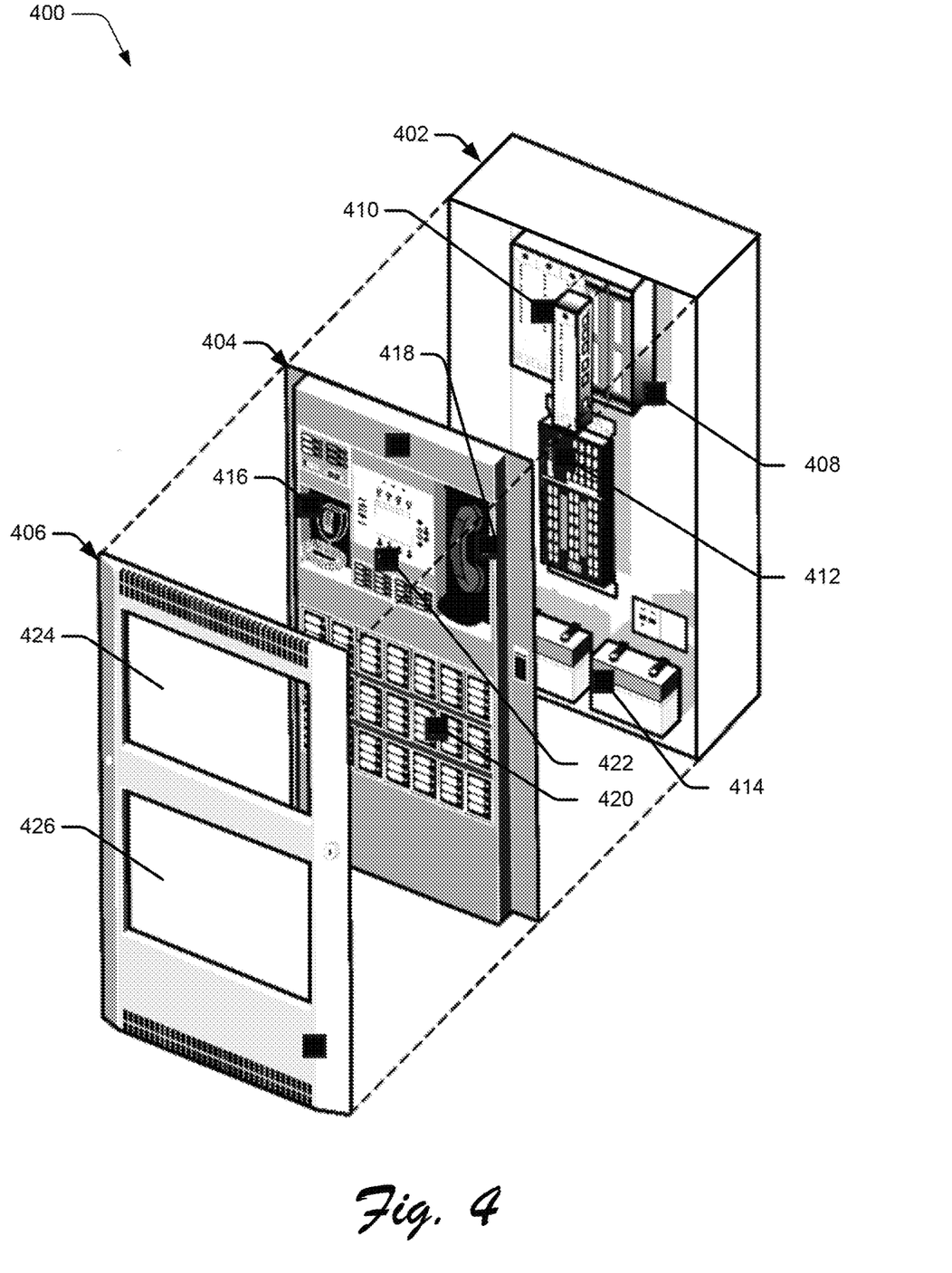
FIG. 4 is an exploded perspective view of an example control panel that may be utilized for the fire detection/notification system represented by FIGS. 1 and 2.

Referring to FIG. 4, there is shown an example control panel 400 that may be utilized for the fire detection/notification system. The control panel 400 includes a back box 402, an inner door mounting plate 404, and an outer door 406, in which the outer door is positioned over the inner door mounting plate to secure and/or protect the inner door mounting plate adjacent to the back box.

The back box 402 of the control panel 400 includes a module card cage 408, one or more module cards (also known as line cards) 410, a power supply 412, and one or more batteries 414. The module card cage 408 is capable of supporting the module card or cards 410, such as the weapons discharge module card. For example, as illustrated in FIG. 4, the module card cage 408 may include multiple compartments in which each compartment includes an electrical interface. A module card 410 may be inserted in a particular compartment of the module card cage 408 for connecting with the corresponding electrical interface and communicating with other components of the fire detection/notification system, and the module card may be removed from the particular compartment for disconnecting from the corresponding electrical interface. The weapons discharge module card, in particular, may be configured to identify the weapons discharge based on data generated by the weapons discharge sensors and produce an alert signal in response to identifying the weapons discharge. The weapons discharge module card may also detect and react to other acoustic abnormalities that indicate one or more hazards. The power supply 412 provides electrical power to the various components of the control panel 400, and the batteries 414 provide additional electrical power to the various components where the electrical power provided by the power supply is insufficient.

The inner door mounting plate 404 includes a master microphone 416, a master telephone 418, one or more control modules 420, and a user interface 422. The master microphone 416 may be used for one-way communications to speakers and other audio output devices of the fire detection/notification system to emit voice announcements. The master telephone 418 may be used for two-way communications with other two-way devices within, or in communication with, the fire detection/notification system. The control modules 420 configures the control panel 400 for general operations such as controlling output devices, input devices, fans, switches, and lighting of the fire detection/notification system that are connected to and managed by the control panel. The user interface 422 allows a user to interact, monitor, and control various functions of the control panel 400, such as an operator interface.

The outer door 406 of the control panel 400 provides general support and protection of the components of the back box 402 and the inner door mounting plate 404. The outer door 406 also provides access to certain components of the inner door mounting plate 404 to a user. For example, as shown in FIG. 4, the outer door 406 may include a first outer door opening 424 which provides access to the master microphone 416, the master telephone 418, and the user interface 422 of the inner door mounting plate 404 and a second outer door opening 426 which provides access to the control modules 420 of the inner door mounting plate.

Figure 5:
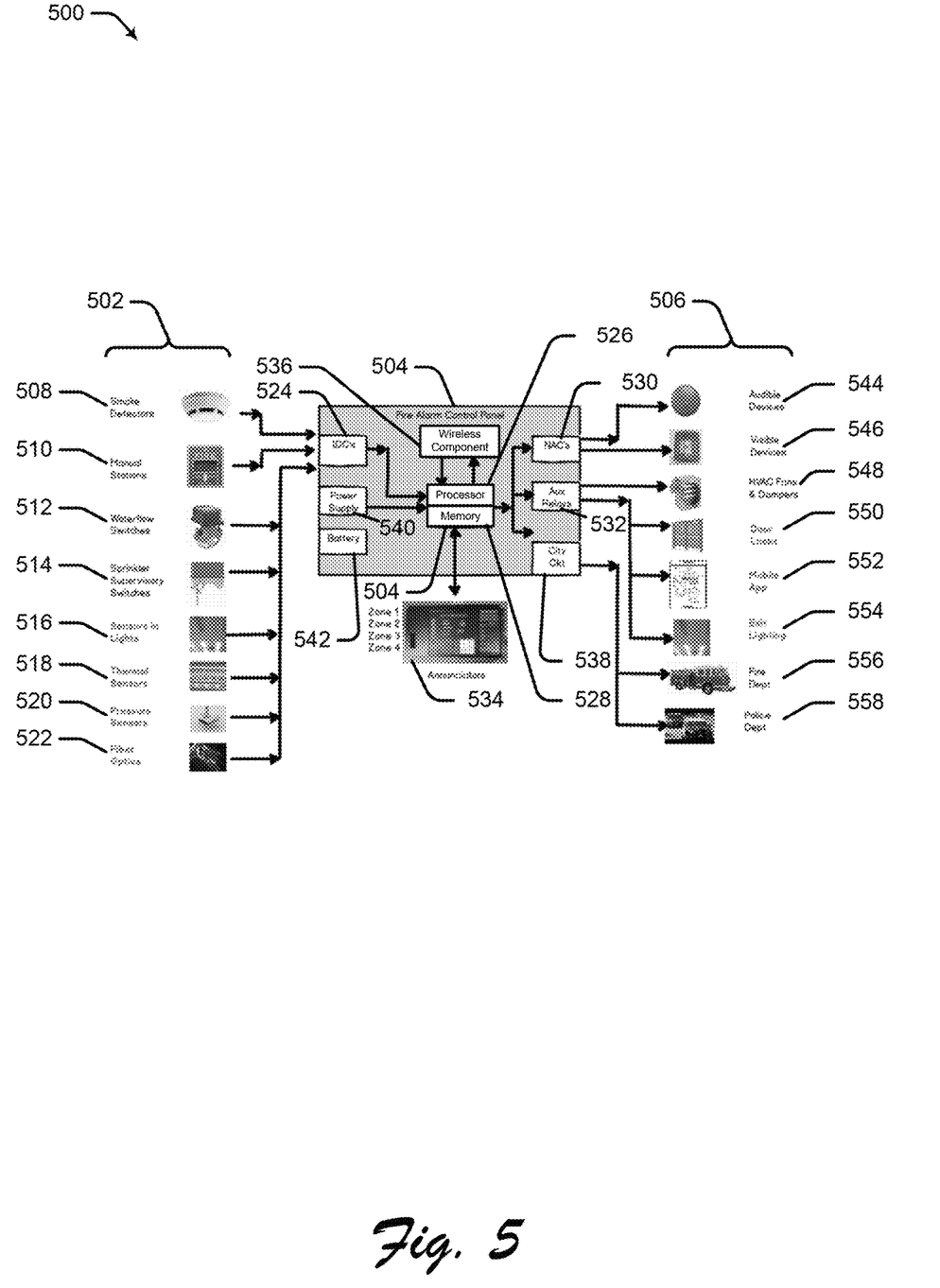
FIG. 5 is a block diagram of an example control panel, and associated input and output devices, that may be utilized for the fire detection/notification system represented by FIGS. 1 and 2.

Referring to FIG. 5, there is shown a fire detection/notification subsystem 500 of an example control panel 504 and associated input devices 502 and output devices 506 communicating with the control panel. Examples of the input devices 502 include, but are not limited to, weapons discharge/smoke detectors 508, manual stations 510, waterflow switches 512, sprinkler supervisory switches 514, light sensors 516, thermal sensors 518, pressure sensors 520, and fiber optics 522. Some or all of the input devices 502 may provide data to the control panel 504 that may be useful for detecting and identifying a weapons discharge. For example, the light sensors 516 may include illumination, motion, detection, image, air quality, and occupancy detection components that may share environmental information with the control panel. Also, the thermal and pressure sensors 518, 520 may detect thermal signatures and air pressure signatures, respectively, to assist with identification of the weapons discharge. In addition, fiber optics 522, such as fiber optic cables, may be positioned in walls, floors, ceilings, and/or other structures of a facility may detect acoustic waves travelling through the fiber optics and provide information about the acoustic waves to the control panel 504. The information about the acoustic waves may assist the control panel 504 to identify a weapons discharge in proximity to the fiber optics 522. Additional sensors may be added, or existing sensors may be enhanced to detect other hazards such as break-ins, calls for help, abnormal acoustics, etc.

The control panel 504 includes an initiating device circuit ("IDC") 524, one or more processors 526, and one or more memory components 528. The initiating device circuit 524 is configured to receive signals from one or more initiating devices, such as input devices 502, and provide data to the processor 526 based on the received signals. The processor 526 may execute code and process data received other components of the control panel 504 such as information received at the initiating device circuit 524 or stored at the memory component 528. The code associated with the fire detection/notification system, particularly the weapons discharge feature, and stored by the memory component 528 may include, but is not limited to, operating systems, applications, modules, drivers, and the like. An operating system includes executable code that controls basic functions of the control panel 504, such as interactions among the various components of the control panel, communication with responding devices via responding device circuits, such as NAC circuit 530 and auxiliary relay circuit 532, and storage/retrieval of code/data to and from the memory component 528. Each application includes executable code to provide specific functionality for the processor 526 and/or remainder of the control panel 504. Examples of applications executable by the processor 526 and stored by the memory component 528 include, but are not limited to, fire detection/notification applications and weapons discharge detection applications. Data is information of the fire detection/notification system that may be referenced and/or manipulated by an operating system or application for performing functions of the control panel 504. Examples of data associated with the fire detection/notification system and stored by the memory component 528 may include, but are not limited to, data received from the initiating device circuit 524 based on the input devices 502, data directed to the responding device circuits 530, 532, and data utilized by the weapons discharge module card to identify the weapons discharge based on the received data and produce an alert signal in response to identifying the weapons discharge.

The processor 526 and the memory component 528 of the control panel 504 also represent and include a module card cage capable of supporting multiple module cards, such as the weapons discharge module card (as shown in FIGS. 2 and 4). The weapons discharge module card may be configured to identify the weapons discharge based on the data generated by the weapons discharge sensors of one or more input devices 502 and produce the alert signal in response to identifying the weapons discharge.

The control panel 504 may further include a user interface 534 and wireless component 536. For example, the user interface 534 may include a combination of hardware and software to provide a user with a desired user experience for managing the control panel 504. The components of the user interface may include a variety of video, audio, and/or mechanical components. For example, the user interface 220 may include one or more input components to allow the user to enter information and one or more output components to provide information to the user. The user interface 220, or components thereof, may be separate from the control panel 504 such as an annunciator panel in communication with the control panel 504. The wireless component 536 provide additional wireless communications capabilities to the control panel 504, in addition to the wireless communications for any wireless mesh network by the initiating device circuit 524. For example, the control panel 504 may include a weapons discharge module card configured to receive input relating to the weapons discharge, and the input may be received at the initiating device circuit 524 or the wireless component 536 to provide information about the weapons discharge to the weapons discharge module card.

The processor 526 is configured to manage responding devices via the responding device circuits, namely NAC circuit 530 and the auxiliary relay circuit 532. The processor 526 also contacts one or more emergency responder devices via the output circuit 538 in response to the signals received from one or more initiating device, such as input devices 502, via the initiating device circuit 524. The output circuit 538 of the control panel 504 may utilize wired or wireless technologies to communicate with external devices associated with the emergency responder devices, such as an internet communicator, a cellular dialer, a plain old telephone system or landline ("POTS"), or a radio. The wireless technologies may utilize multi-band wireless communication to hinder an external party, such as a perpetrator, from blocking frequencies and to offer greater resilience to outside interference. Examples of the wireless technologies for communication include, but are not limited to, satellite-based communications, cellular-based communications and their variants, and wireless local area network (WLAN) communication and their variants. Examples of WLAN communications include, but are not limited to, IEEE 802.11 (Wi-Fi), IEEE 802.16 (WiMAX), Bluetooth, BLE, and Zig-Bee. Wireless communications may further include other forms of communication such as microwave or infrared technology (IR). Examples of the wired technologies for communication include, but are not limited to, physical conduits, such as an electrical cable or optical fiber cable.

The control panel 504 may further comprise a power source, such as a power supply 540 and/or portable batteries 542. The power source provides primary or auxiliary power to the other components of the control panel 504 of the fire detection/notification system.

As stated above, the control panel 504 includes responding device circuits to communicate with the output devices 506 of the fire detection/notification subsystem 500. A responding device circuit may be, for example, the NAC circuit 530 or the auxiliary relay circuit 532. Examples of the output devices 506 include, but are not limited to, audible devices 544, visible devices 546, HVAC fans and dampers 548, door locks 550, mobile apps 552, and exit lighting 554. Some or all of the output devices 506 may receive signals from the control panel 504 that for managing a situation involving a weapons discharge. For example, the door locks 550 may secure certain portals of a facility in response to detection of a weapons discharge based on the location of the perpetrator and/or other occupants. Also, the control panel 504 may provide information about the situation to any communication device, such as a mobile device or a computer, within communication range. Further, the exit lighting 554 may be activated or controlled to provide guidance to occupants of the facility in response to detection of the weapons discharge.

As stated above, the control panel 504 may communicate with one or more emergency responder devices external to the fire detection/notification system via the output circuit 538. Examples of emergency responder devices external to the fire detection/notification system include, but are not limited to, a fire department 556, a law enforcement agency 558, and a hospital facility. For example, the control panel 504 may be configured to identify a fire-related hazard based on first data generated by the fire-related detection sensor and produce a first alert signal in response to identifying the fire-related hazard. In response, the output circuit 538 may be configured to communicate with the fire department 556 and the hospital facility in response to receiving the first alert signal. Similarly, the control panel 504 may be configured to identify the weapons discharge based on second data generated by the first and second weapons discharge sensors and produce a second alert signal in response to identifying the weapons discharge. In response, the output circuit 538 may be configured to communicate with the law enforcement agency 558 and the hospital facility in response to receiving the second alert signal.

It is to be understood that FIG. 5 is provided for illustrative purposes only to represent examples of the components of an example control panel 504 and its associated input and output devices 502, 506, and is not intended to be a complete diagram of the various components that may be utilized by the panel and devices. Therefore, the control panel 504 may include various other components not shown in FIG. 5, may include a combination of two or more components, or a division of a particular component into two or more separate components, and still be within the scope of the present invention.

Figure 6:
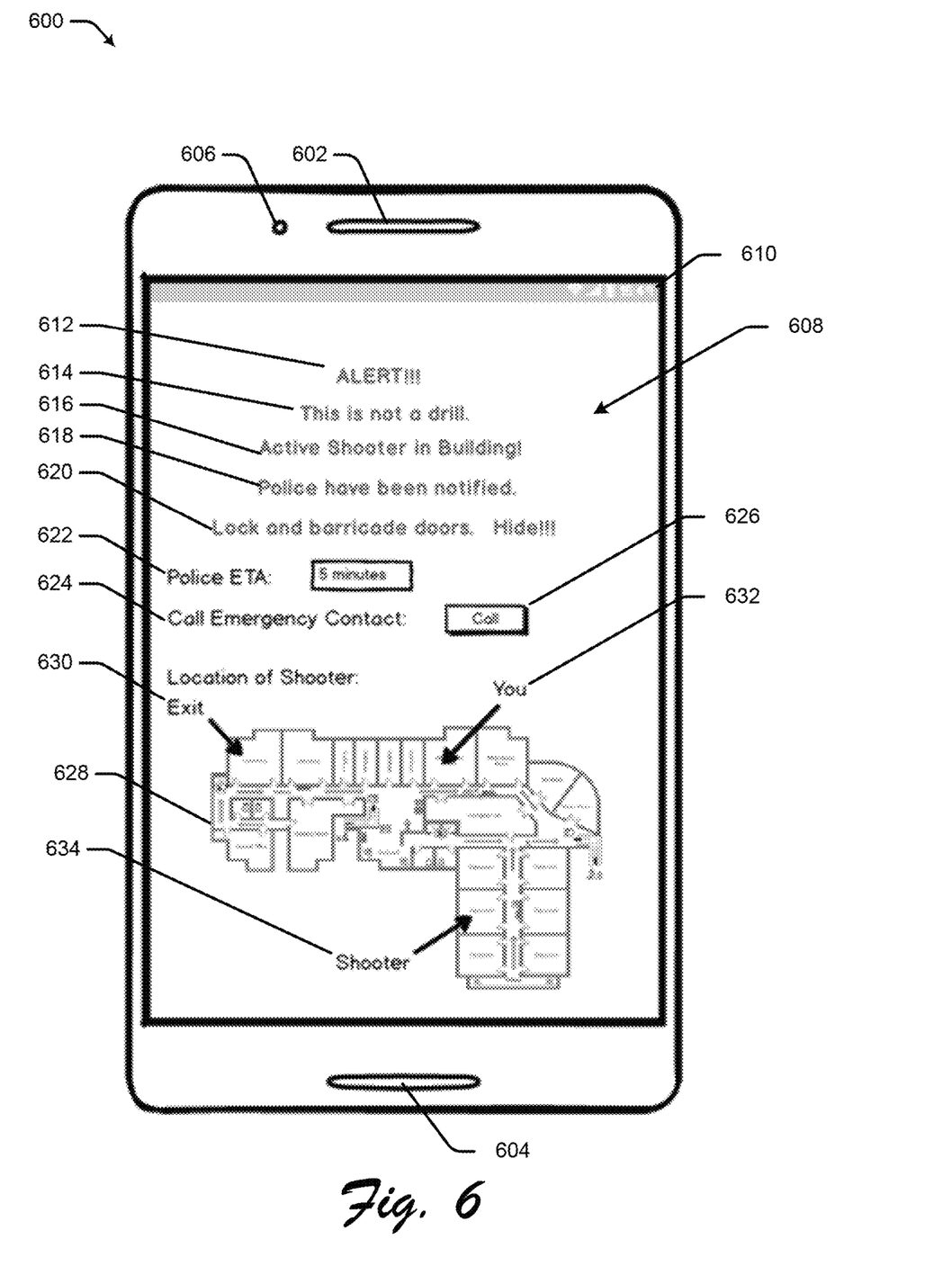
FIG. 6 is a front planar view representing an example display of a mobile device based on example communications with the fire detection/notification system in accordance with the present invention.

Referring to FIG. 6, there is illustrated a communication device, such as a mobile device 600, that may receive information about weapons discharge situation from the fire detection/notification system or, more particularly, the control panel of the fire detection/notification system. The mobile device 600 may include various basic components, such as an earpiece 602, a microphone 604, one or more sensors 606, and a display 608. The display 608 of the mobile device 600 may include general information 610 for operation of the mobile device and specific information 612-634 about a weapons discharge situation. For some embodiments, the specific information may include helpful information about the weapons discharge situation, such as an importance indicator 612, incident status 614, perpetrator status 616, law enforcement status 618, and guidance 630 for the user of the mobile device 600. For some embodiments, the specific information may include the estimated time of arrival 622 by law enforcement or other emergency responders, information about establishing communication 624 with an emergency contact and/or a button or link 626 to establish communication with the emergency contact. For some embodiments, the specific information may include a map 628 of the facility impacted by the weapons discharge. The map 628 may or may not indicate one or more exit locations 630, a mobile device location 632, and/or one or more perpetrator locations 624.

Figure 7:
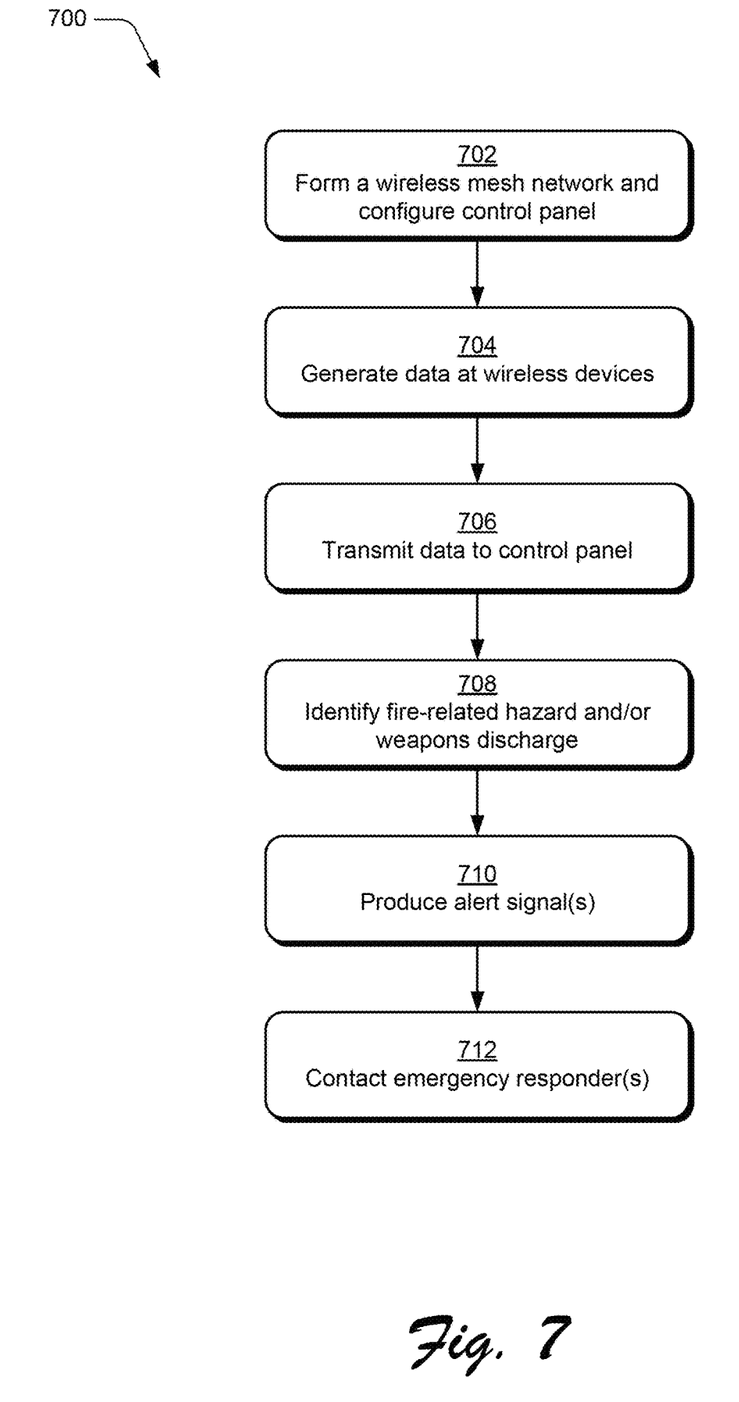
FIG. 7 is a flow diagram representing an example operation of the fire detection/notification system in accordance with the present invention.

Referring to FIG. 7, there is shown an example operation of the fire detection/notification system for detecting a weapons discharge. As described above, the fire detection/notification system includes a network of devices and a control panel. The network of device may be a wired network of wired device or a wireless mesh network of wireless devices. The network of devices may be formed for the fire detection/notification system, and one or more control panels of the fire detection/notification system may be configured at step 702. The network of device may be formed so that each device includes a fire-related detection sensor, a first weapons discharge sensor, and a second weapons discharge sensor. The control panel may be configured to perform a function of identifying the weapons discharge based on, and in response to, the data received from one or more devices. For example, a weapons discharge module card may be installed to a module card cage of the control panel and the weapons discharge module card may then be configured to perform the function.

After forming the network of devices and configuring the control panel, first data associated with a fire-related hazard and second data associated with a weapons discharge hazard may be generated at a detection unit of each device at step 704. The first and second data may be transmitted, from a base or smart base of each device, to a control panel connected by wired or wireless connection to the network at step 706. A fire-related hazard is any type of emergency situation associated with fire detection/notification systems, such as hazardous air quality detected by a smoke detector. A weapons discharge hazard is any type of emergency situation associated with weapons detection systems, such as a hazardous gunshot-like sound detected by an audio sensor or another sensor.

After receiving the first and second data, the control panel identifies a fire-related hazard based on the first data at step 708 and produces a first alert signal in response to identifying the fire-related hazard at step 710. Also, after receiving the first and second data, the control panel identifies a weapons discharge based on the second data at step 708 and produces a second alert signal in response to identifying the weapons discharge at step 710. It is to be understood that the first alert signal, the second alert signal, or both alert signals may be produced by the control panel at step 710. Regarding the second alert signal in particular, a weapons discharge module card of the control panel may identify the weapons discharge based on the second data and producing the second alert signal in response to identifying the weapons discharge.

After producing the alert signal or signals, the control panel may communicate with one or more emergency responder devices external to the fire detection/notification system in response to receiving the first alert signal, the second alert signal, or both signals, at step 712. For example, the control panel may communicate with a fire department in response to receiving the first alert signal. For another example, the control panel may communicate with a law enforcement agency in response to receiving the second alert signal. For yet another example, the control panel may communication with the fire department and the law enforcement agency in response to receive the first and second alert signals. The control panel may also communicate with one or more communication devices, such as the mobile device illustrated by FIG. 6 or a computer, in response to the first alert signal, the second alert signal, or both signals. The control panel may further send an audible and visible alarm in the facility as well as control facility access and portals.

Those skilled in the art will recognize that, for simplicity and clarity, the full structure and operation of all systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of fully functional systems, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A fire detection/notification system for detecting a weapons discharge comprising:
   a network including a plurality of devices, each device of the plurality of devices including a smart base and a detection unit, wherein:
      the detection unit includes a fire-related detection sensor;
      the smart base includes a first weapons discharge sensor and a second weapons discharge sensor, wherein the first weapons discharge sensor includes an audio sensor, the second weapons discharge sensor includes a non-audio sensor, and the smart base is configured to communicate via the network; and
   a control panel connected to the network, the control panel being configured to identify a weapons discharge hazard based on data generated by the first and second weapons discharge sensors and produce an alert signal in response to identifying the weapons discharge hazard, wherein the control panel includes an output circuit configured to communicate with an emergency responder device external to the fire detection/notification system in response to receiving the alert signal.

2. The fire detection/notification system described by claim 1, wherein the smart base is affixed to a building structure, whereas the detection unit is removably attached to the smart base.

3. The fire detection/notification system described by claim 1, wherein each device of the plurality of devices transmits wirelessly information detected by the detection unit of the device and serves as a wireless relay for other devices of the network.

4. The fire detection/notification system described by claim 1, wherein the second weapons discharge sensor includes at least one audio sensor selected from the group consisting of a glass breakage sensor, a portal intrusion sensor, a request for assistance sensor, an unattended appliance sensor, an unusual vehicle operation sensor, a machine failure sensor, or occupancy sensor.

5. The fire detection/notification system described by claim 1, wherein the non-audio sensor is selected from the group consisting of an infrared detector, a thermal sensor, a pressure sensor, a fiber optics sensor, or portal status sensor.

6. A method of a fire detection/notification system for detecting a weapons discharge, the fire detection/notification system including a network of devices and a control panel, the method comprising:
- generating, at a detection unit of a device of the network of devices, first data associated with a fire-related hazard detected by a fire-related detection sensor;
- generating, at a smart base of the device of the network of devices, second data associated with a weapons discharge hazard detected by a first weapons discharge sensor and a second weapons discharge sensor of the smart base, the first weapons discharge sensor including an audio sensor;
- transmitting, from the smart base of the device of the network of devices, at least one of the first data or the second data to the control panel;
- identifying, at the control panel, the weapons discharge hazard based on the second data generated by the first and second weapons discharge sensors;
- producing, at the control panel, an alert signal in response to identifying the weapons discharge hazard; and
- communicating with an emergency responder device external to the fire detection/notification system in response to receiving the alert signal.

7. The method described by claim 6, further comprising:
affixing the smart base to a building structure; and
removably attaching the detection unit to the smart base.

8. The method described by claim 6, further comprising:
- transmitting wirelessly, by each device of the plurality of devices, information detected by at least one sensor selected from the group consisting of the fire-related detection sensor, the first weapons discharge sensor, or the second weapons discharge sensor; and
- serving, by each device of the plurality of devices, as a wireless relay for other devices of the network of devices.

9. The method described by claim 6, wherein the second weapons discharge sensor includes at least one audio sensor selected from the group consisting of a glass breakage sensor, a portal intrusion sensor, a request for assistance sensor, an unattended appliance sensor, an unusual vehicle operation sensor, a machine failure sensor, or occupancy sensor.

10. The method described by claim 6, wherein the second weapons discharge sensor includes at least one non-audio sensor selected from the group consisting of an infrared detector, a thermal sensor, a pressure sensor, a fiber optics sensor, or portal status sensor.

11. A fire detection/notification system for detecting a weapons discharge comprising:
- a network including a plurality of devices, each device of the plurality of devices including a fire-related detection sensor, a first weapons discharge sensor, and a second weapons discharge sensor, the first weapons discharge sensor including an audio sensor and the second weapons discharge sensor including a non-audio sensor; and
- a control panel connected to the network, the control panel being configured to identify a weapons discharge hazard based on data generated by the first and second weapons discharge sensors and produce an alert signal in response to identifying the weapons discharge hazard, wherein the control panel includes an output circuit configured to communicate with an emergency responder device external to the fire detection/notification system in response to receiving the alert signal.

12. The fire detection/notification system described by claim 11, wherein each device of the plurality of devices includes a base affixed to a building structure and a detection unit removably attached to the base, and the detection unit includes the fire-related detection sensor, the first weapons discharge sensor, and the second weapons discharge sensor.

13. The fire detection/notification system described by claim 11, wherein each device of the plurality of devices transmits wirelessly information detected by at least one sensor selected from the group consisting of the fire-related detection sensor, the first weapons discharge sensor, or the second weapons discharge sensor, and each device serves as a wireless relay for other devices of the network.

14. The fire detection/notification system described by claim 11, wherein the second weapons discharge sensor includes at least one audio sensor selected from the group consisting of a glass breakage sensor, a portal intrusion sensor, a request for assistance sensor, an unattended appliance sensor, an unusual vehicle operation sensor, a machine failure sensor, or occupancy sensor.

15. The fire detection/notification system described by claim 11, wherein the non-audio sensor is selected from the group consisting of an infrared detector, a thermal sensor, a pressure sensor, a fiber optics sensor, or portal status sensor.

16. A method of a fire detection/notification system for detecting a weapons discharge, the fire detection/notification system including a network of devices and a control panel, the method comprising:
- generating, at a device of the network of devices, first data associated with a fire-related hazard detected by a fire-related detection sensor;
- generating, at the device of the network of devices, second data associated with a weapons discharge hazard detected by a first weapons discharge sensor and a second weapons discharge sensor, the first weapons discharge sensor including an audio sensor;
- transmitting, from the device of the network of devices, at least one of the first data or the second data to the control panel;
- identifying, at the control panel, the weapons discharge hazard based on the second data generated by the first and second weapons discharge sensors;
- producing, at the control panel, an alert signal in response to identifying the weapons discharge hazard; and
- communicating with an emergency responder device external to the fire detection/notification system in response to receiving the alert signal.

17. The method described by claim 16, wherein each device of the plurality of devices includes a base and a detection unit, and wherein the detection unit includes the fire-related detection sensor, the first weapons discharge sensor, and the second weapons discharge sensor, the method further comprising:
affixing the base to a building structure; and
removably attaching the detection unit to the base.

18. The method described by claim 16, further comprising:
- transmitting wirelessly, by each device of the plurality of devices, information detected by at least one sensor of the fire-related detection sensor, the first weapons discharge sensor, or the second weapons discharge sensor; and
- serving, by each device of the plurality of devices, as a wireless relay for other devices of the network of devices.

19. The method described by claim 16, wherein the second weapons discharge sensor includes at least one audio sensor selected from the group consisting of a glass breakage sensor, a portal intrusion sensor, a request for assistance sensor, an unattended appliance sensor, an unusual vehicle operation sensor, a machine failure sensor, or occupancy sensor.

20. The method described by claim 16, wherein the second weapons discharge sensor includes at least one non-audio sensor selected from the group consisting of an infrared detector, a thermal sensor, a pressure sensor, a fiber optics sensor, or portal status sensor.

* * * * *